E. WEINTRAUB.
ELECTRIC FURNACE METHOD AND APPARATUS.
APPLICATION FILED OCT. 27, 1909.
1,019,392.
Patented Mar. 5, 1912.
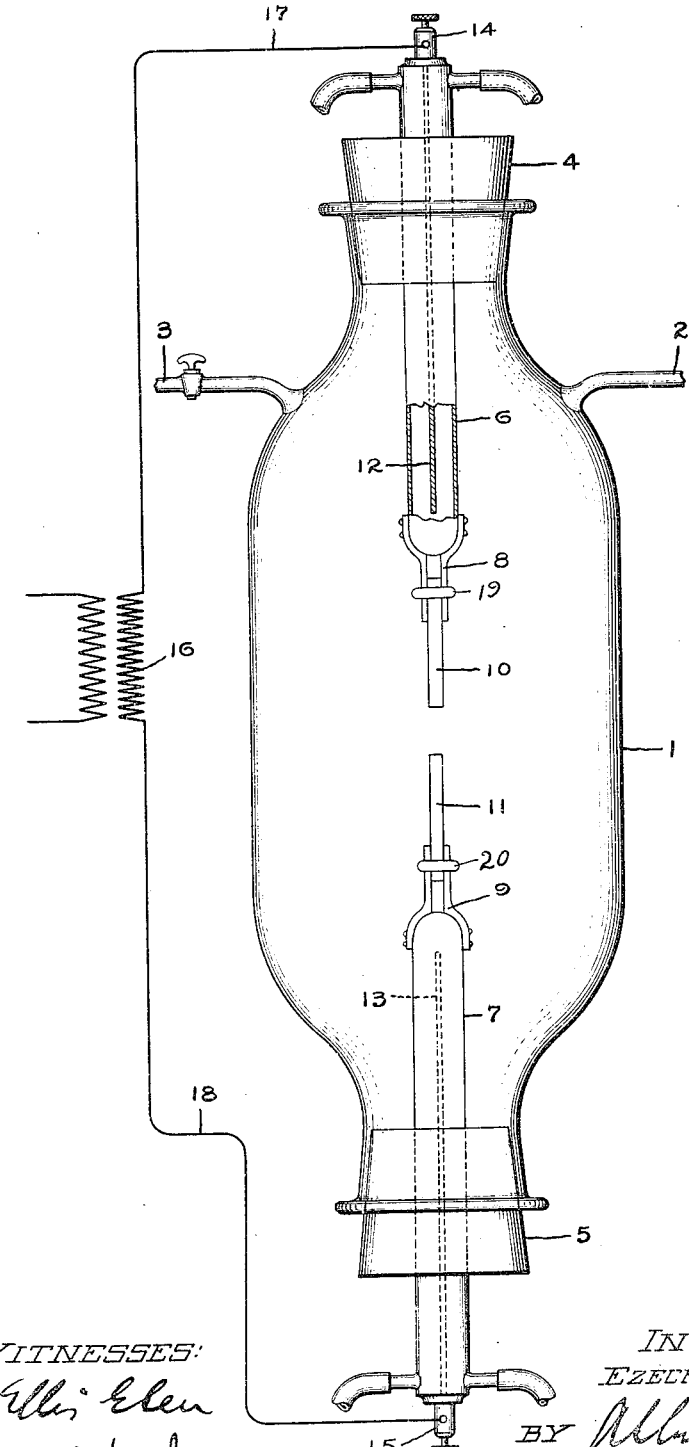
WITNESSES:
J. Ellis Glen
Helen Orford
INVENTOR
EZECHIEL WEINTRAUB
BY Albert G. Davis
HIS ATTORNEY

UNITED STATES PATENT OFFICE.

EZECHIEL WEINTRAUB, OF LYNN, MASSACHUSETTS, ASSIGNOR TO GENERAL ELECTRIC COMPANY, A CORPORATION OF NEW YORK.

ELECTRIC FURNACE METHOD AND APPARATUS.

1,019,392.  Specification of Letters Patent.  Patented Mar. 5, 1912.

Application filed October 27, 1909. Serial No. 524,947.

*To all whom it may concern:*

Be it known that I, EZECHIEL WEINTRAUB, a citizen of the United States, residing at Lynn, in the county of Essex, State of Massachusetts, have invented certain new and useful Improvements in Electric Furnace Methods and Apparatus, of which the following is a specification.

My present invention relates to electric furnaces, and comprises a furnace operative with electrical energy of high potential, and especially adapted for the treatment and fusion of refractory elements and compounds.

My invention also includes the method whereby refractory materials, even though but slightly conductive, can be used as electrodes for a high potential arc, and may there be treated and even fused by the heating action of that arc.

More specifically, my invention contemplates the purification and fusion of boron or the dissociation of boron compounds when used as an electrode for the high potential furnace herein disclosed.

The drawing forming a part of this specification is an elevation somewhat diagrammatic, illustrating the general arrangement of the several elements and the general construction of the furnace when built, on a small scale.

The furnace comprises a gas-tight envelop 1 of glass, copper or other material, inert with respect to the materials under treatment, and provided with an outlet 2 by which connection may be made with a vacuum pump, and also provided with an inlet 3 by which hydrogen or other suitable gas or gases can be introduced. Removable closures 4 and 5 are provided for the ends of the furnace, and serve to support copper tubes 6 and 7, closed at their ends and carrying respectively the clamps 8 and 9 in which are mounted sticks or rods 10 and 11 of the material to be subjected to heat treatment. To secure water cooling for the copper tubes 6 and 7, I provide each of them with longitudinal partitions 12, 13 extending almost to the closed inner end of the tube and serving to divide the tube into two separate channels through which water may be kept flowing. Electrical connection is made between the terminals 14 and 15 and a source of current of high potential as the secondary of the transformer 16 by means of conductors 17, 18.

The pressure of hydrogen within the chamber is regulated to accord with the work in hand and may vary all the way from atmospheric pressure down to as low a pressure as about 5 inches mercury.

Current is supplied to the furnace at potential preferably in the neighborhood of 15,000 to 30,000 volts and may be either alternating current or direct current. Direct current of a very high voltage suitable for this work, can be obtained through a mercury arc rectifier operating on an alternating current source of high voltage. The current being at this high voltage jumps the gap between the electrodes at starting and establishes an arc without the necessity of bringing the electrodes into initial contact. This method is therefore specially applicable to the treatment of material which is a poor conductor to begin with as the high potential applied establishes an arc in spite of the slight conductivity of the material of the electrode.

The presence of an appreciable quantity of hydrogen or other inert gas within the furnace chamber restricts the length of the arc and concentrates its thermal action on the tips of the electrodes. There is therefore little tendency for the arc to wander about over the electrode or to jump to the holding clamps or other parts of the furnace. This is especially important on account of the tendency of the high potential to lengthen the arc when it is once established.

Both electrodes may be of the same material or if absolute purity of the resulting product is not desired, the coöperating electrode may be of some other material. Both electrodes melt at their ends and by prolonging the run both can be melted down into dense homogeneous globules. It will be understood that fusion is not carried far enough to contaminate the globules by metal fused from the supporting clamps, though if the electrode consists of boron held in a copper clamp there is little danger of contaminating the boron with copper as these two elements do not alloy with one another.

It will be understood that this furnace can be used in the treatment and fusion of many refractory elements and compounds, though it affords special advantage for the production of pure and conductive boron as hereinafter described more at length.

The technical literature describes the reduction of boron anhydrid with magnesium. If the theoretical amount of magnesium sufficient to combine with the oxygen present in the anhydrid or an excess of magnesium is used it is found that magnesium is an essential component of the resulting product. The proportions ordinarily used were two parts of anhydrid to one part magnesium. Moissan used three parts of boric anhydrid and one part magnesium in the endeavor to obtain the product free from magnesium. The resulting product, however, contains three to four per cent. of magnesium. In order to free it from this magnesium, Moissan recommends a fusion with 50 times its weight of boric anhydrid. After treating the product in this manner, he reports analyses running as high as 98 to 99% boron. I have repeated the experiment many times and find that the product always contains appreciable oxygen, though in other respects corresponding with Moissan's description.

It may be mentioned here that the presence of combined oxygen is always difficult to detect and similar cases of mistaking a suboxid for an element have occurred before. Moissan's boron is described by him as being a brownish powder, substantially non-conductive for electrical current, and vaporizing without fusion.

I have discovered that if the reaction between the boric anhydrid and the magnesium is carried on with an excess of boric anhydrid, and at a higher temperature than employed by Moissan, boron suboxid is produced directly free from magnesium.

Finely divided magnesium is thoroughly mixed with finely powdered boric anhydrid, $B_2O_3$, in the proportions of three to five parts of anhydrid to one of magnesium. The mixture is placed in a suitable crucible, such as a clay or graphite crucible, and heated in a suitable furnace to a temperature of at least 1300° C. to 1600° C. A temperature even higher than this is of advantage. This high temperature can be most conveniently obtained in an electric furnace, such as a resistance furnace. However, as the reaction itself is exothermic and generates considerable heat, I find the required high temperature can be obtained even in a gas furnace if a large mass of material is used, so that the heat generated by the reaction is conserved. The result of the reaction when carried out under these conditions is boron suboxid, containing magnesium borate as a by-product. The magnesium borate is removed, by washing with water and acid, as hydrochloric acid.

In my patent No. 997,879 issued to me July 11, 1911, filed by me December 4, 1906, I have described and claimed the method of making pure fused conductive boron by suitable heat treatment of dissociable boron compounds, such as boron-suboxid, or magnesium borid. The operation includes heating the metal in a vacuum to distil magnesium, and to produce such other changes as are necessary to make it slightly conductive. After that, the material, preferably in the form of a stick, is mounted as anode for a mercury vapor arc, and is there heated even to the temperature of fusion. After such treatment, the boron possesses qualities quite foreign to the material designated by Moissan as pure boron.

According to the present invention, the non-conductive powdered suboxid of boron or the magnesium borid is converted into conductive fused pure boron all in a single furnace operation and without danger of contaminating the boron with carbon or other foreign element.

Starting with suboxid of boron or with magnesium borid I press the material into sticks or rods. These sticks or rods are preheated to about 1000° C. to render them slightly conductive and are then mounted as electrodes in the furnace shown in the accompanying drawing. As shown, they are held by the copper clamps 8, 9 which are held together by the copper rings 19, 20. Both electrodes may be of the same material, or one electrode may be of some other highly refractory element, insert with respect to boron. If the electrodes are initially separated by a distance of about one-fourth of an inch, and are surrounded by hydrogen at a pressure equal to or exceeding that of five inches of mercury, the voltage necessary to cause the current to jump the gap and start an arc, will be in the neighborhood of from 15,000 to 30,000 volts. Under these conditions, the impure boron electrodes need be but slightly conductive. The hydrogen atmosphere keeps the arc concentrated on the extreme ends of the boron sticks. With such a high voltage between the electrodes, a large expenditure of energy is possible without the use of more than a small amount of current. I find that as the impure boron sticks progressively heat up and fuse, the boron loses its magnesium or oxygen, as the case may be, and becomes very pure and dense.

The furnace operation above described can be used in other relations, as, for instance, in the fusion of sticks pressed up from pure boron. In this case, the fusing serves not to purify the boron, but mainly to change it into a denser form.

The high potential furnace herein described affords a means for making boron alloys containing even but a trace of some other element. To accomplish this result, pure powdered boron is mixed with the other element and then pressed into sticks and fused down, as in the case of pure boron. Thus, boron powder and graphitized lamp black may be mixed together and finally heated to produce dense bodies of boron chemically united with carbon.

In a modified form of furnace one electrode is a watercooled copper crucible, the other a watercooled copper tube. The material is placed in the crucible and the high potential arc is made to play on the material from the copper tube electrode until it is fused.

What I claim as new and desire to secure by Letters Patent of the United States, is,

1. An electric furnace comprising a glass envelop, means for exhausting the envelop, means for supplying hydrogen thereto, water-cooled stationary terminals for said furnace, means for supporting at the end of at least one terminal refractory material to constitute an electrode for the furnace, and means for establishing and maintaining a high voltage arc between said refractory material and the other electrode.

2. The method of fusing a refractory powder of low conductivity, which consists in compressing it into a stick, mounting it in a chamber containing hydrogen and maintaining a high voltage arc to the stick until fused.

3. The method of forming dense, fused bodies from refractory material of low conductivity, which consists in mounting the material as electrode for a furnace, and there heating it progressively by a high potential arc operating in an inert gas.

4. The method of making pure conductive boron, which consists in shaping impure boron into a stick and then heating said stick by running it as electrode for a high potential arc.

5. The method of making pure boron from magnesium borid, which consists in heating magnesium borid with a high potential arc running to said borid in an inert environment.

6. The method which consists in reducing boric anhydrid with an excess of magnesium, shaping the resultant product into a stick, mounting the stick as anode for a furnace, and initiating and maintaining a high voltage arc to said stick until the magnesium has been driven out.

7. The method of making pure boron from impure boron, which consists in shaping the impure boron into sticks, mounting them as electrodes for a furnace, initiating a high voltage arc between said electrodes and concentrating the heating action of said arc on adjacent ends of the two opposing electrodes.

8. The method of consolidating powdered material into a dense, uniform, homogeneous body, which consists in compressing the powder into a stick, mounting the stick as electrode for a furnace, maintaining a high voltage arc to said stick, and localizing the heating action of said arc on an end of the stick.

9. The method of making elemental boron from a dissociable boron compound which consists in heating said compound with a high potential arc running therefrom as an electrode in a gas inert with respect to boron.

In witness whereof I have hereunto set my hand this 26th day of October, 1909.

EZECHIEL WEINTRAUB.

Witnesses:
JOHN A. MCMANUS, Jr.,
CHARLES A. BARNARD.